Aug. 30, 1938.  W. J. ETTINGER  2,128,807

TEMPERATURE CONTROL DEVICE

Filed Aug. 27, 1936

Inventor:
Wallace J. Ettinger,
by Harry E. Dunham
His Attorney.

Patented Aug. 30, 1938

2,128,807

UNITED STATES PATENT OFFICE 2,128,807

TEMPERATURE CONTROL DEVICE

Wallace J. Ettinger, Chicago, Ill., assignor to Edison General Electric Appliance Corporation, Inc., a corporation of New York Application August 27, 1936, Serial No. 98,136

10 Claims. (Cl. 200—139)

This invention relates to temperature control devices, more particularly to devices for controlling an electric circuit in accordance with temperature changes, and it has for its object the provision of an improved device of this character.

While this invention has more general application, it is particularly useful in controlling the temperature of an electric oven.

Figure 1:
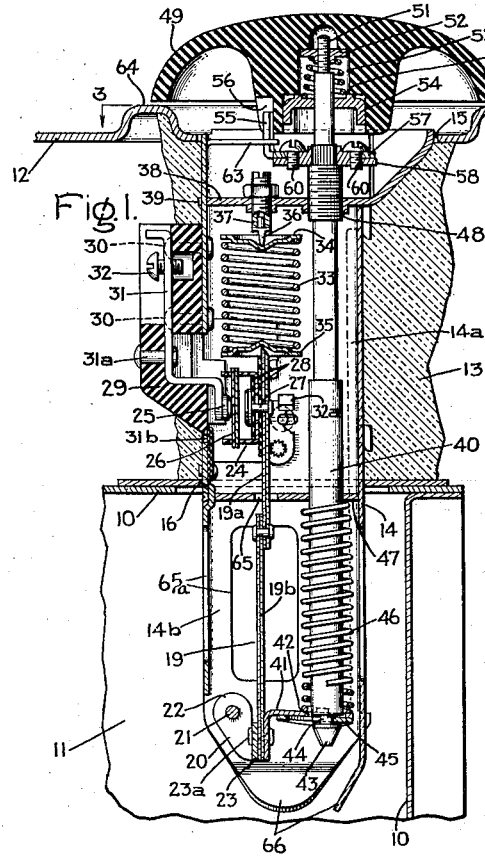
Figure 2:
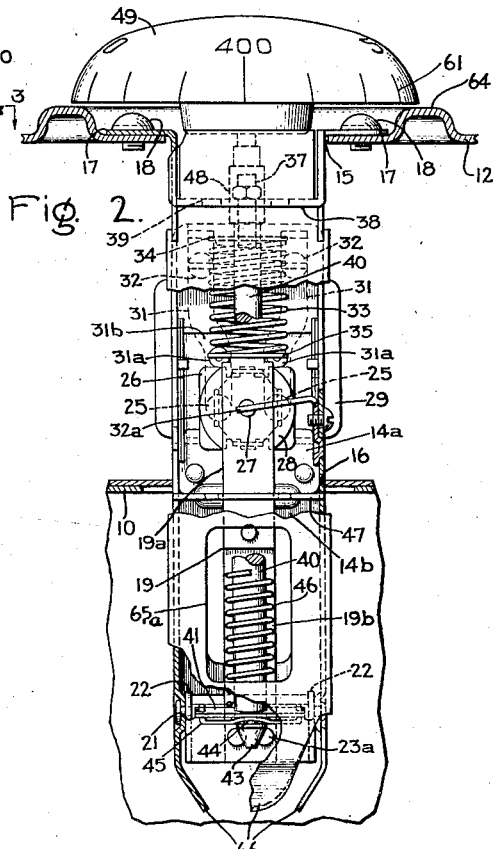
Figure 3:
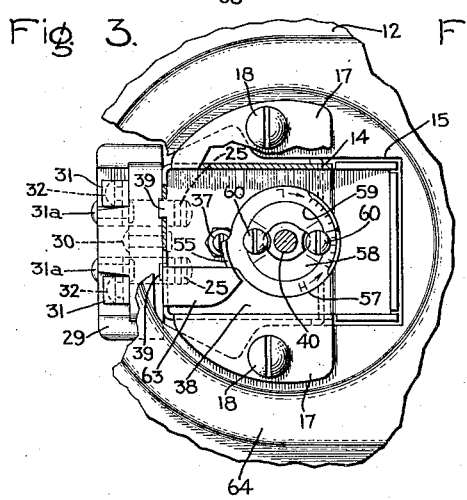
Figure 4:
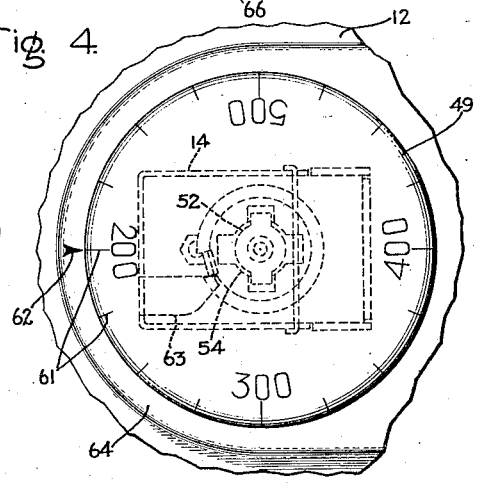

For a more complete understanding of this invention, reference should be had to the accompanying drawing in which Fig. 1 is a vertical elevation in section of a temperature control device embodying this invention; Fig. 2 is an elevation of the temperature control device of Fig. 1, parts being broken away so as to illustrate certain details of construction; Fig. 3 is a view taken through the line 3—3 of Fig. 1; and Fig. 4 is a plan view of the temperature control device of Figs. 1 and 2.

Referring to the drawing, this invention has been shown as applied to an electrically heated oven having an inner lining 10 defining a heating chamber 11 and an outer lining 12 spaced from the inner lining and defining an outer casing for the oven. Interposed between the linings 10 and 12 is a layer 13 of a suitable heat insulating material, such as rock wool.

The temperature control device for the oven in accordance with this invention comprises an elongated casing 14, which as shown (Figs. 3 and 4), has a substantially rectangular cross-section. It is to be understood, however, that the casing may have any suitable shape. The casing 14, as shown, is directed through an aperture 15 provided for it in the outer upper wall of the lining 12 and a corresponding aperture 16 provided for it in the inner lining 10. The casing 14, of course, extends through the insulating layer 13. At its upper end, the casing is provided with a pair of outwardly extending ears 17 which are detachably secured to the outer lining in any suitable manner, as by screw-fastening means 18.

A suitable temperature responsive element 19, shown as a bimetallic thermostat bar, is arranged within and longitudinally of the casing 14. The lower end of the bar 19 is rigidly secured to a support 20, which is pivotally mounted upon a pin or shaft 21 arranged transversely of the casing and having its ends secured to the side walls of the casing, in any suitable manner. The support 20, as shown, has a pair of spaced-apart arms 22 that are pivoted on the pin 21 and a portion 23 connecting the arms 22 together. The inner end of the thermostat bar 19 is rigidly secured to the portion 23, in any suitable manner as by means of rivets 23a.

The thermostat bar 19, as shown, extends upwardly through the portion of the casing that projects into the heating chamber 11 and into that portion of the casing lying between the linings 10 and 12, that is, into that portion of the casing surrounded by the insulating layer 13. The upper end portion of the thermostat bar is free to move laterally in response to changes in temperature.

This free end of the thermostat bar 19 is arranged to operate a suitable switch 24 comprising a pair of spaced-apart fixed contacts 25 with which a bridging contact 26 cooperates. The bridging contact 26 has a backing formed of a base metal, such as steel, and a facing formed of a precious metal, such as silver. The bridging contact 26 is secured to the free end of the bimetallic bar in any suitable manner, as by means of a rivet 27. The bridging contact is insulated from the rivet and bimetallic bar by insulating sheets 28 formed of any suitable insulating material, such as mica. The fixed contacts 25 are mounted on a suitable supporting block 29 formed of any suitable insulating material, such as a molded phenol condensation product. The block of insulating material 29 is secured to the casing in any suitable manner, as by means of rivets 30. The fixed contacts 25, as shown, are secured to conducting strips 31 mounted on the insulating block 29 and secured thereto by means of rivets 31a. The block 29 is so arranged as to present the fixed contacts into the casing through an aperture 31b provided for them in the casing. Suitable binding screws 32 are threaded in the conducting strips 31 and function to connect electrical conductors to the control device that serve to connect the device in the circuit to be controlled or in a controlling circuit for the circuit to be controlled. When the bridging contact engages the fixed contacts, as shown in Fig. 1, it completes the circuit through the control device, whereas when it moves away from them, it opens the circuit. The open switch position of the blade 19 is defined by a stop 32a secured to the casing.

Also mounted in that portion of the casing lying between the oven linings is a suitable snap action compression spring 33 having its opposite ends bearing in suitable seats 34 and 35. The seat 34, as shown, rests upon a fixed knife-edge bearing 36, while the seat 35 rests upon a knife-edge bearing formed on the free end of the bimetal blade 19. The knife-edge bearing 36 is mounted in a screw member 37 that is threaded in a supporting member 38. The supporting member 38 is mounted in the upper end of the casing 14 and is secured thereto in any suitable manner, as by means of tongues 39 formed integrally with the support and directed through apertures provided for them in the casing and peened over on the outside. The outer end of the screw 37, as shown, is accessible above the support 38, whereby its position, and hence, the position of the knife-edge bearing 36 may be adjusted. The arrangement of the snap spring and thermostat blade 19 is substantially as described and claimed in the U. S. patent to Lewerenz Reissue No. 18,654, dated June 14, 1927. As there described, the snap spring 33 forms a toggle joint with the thermostatic bar 19 and functions to snap the bar, and hence, the switch between its opened and closed positions. As described in this patent, the spring resists movement of the thermostat bar to carry the switch from either its opened or closed positions with a decreasing force until the bar and spring arrive at a neutral position, whereupon the spring functions to move the bar quickly through and away from the neutral position to its other controlling position with an increasing force. The neutral position is defined by an imaginary line passing substantially from the knife-edge bearing 36 to the fixed point of support of the thermostat bar 19.

The temperature adjustment of my control device is effected by changing the angular relation of the bar 19 and the spring 33 so as to vary the position of the neutral line. This is accomplished by adjusting the position of the support 20. For this purpose an adjusting rod or screw 40 is provided. This rod extends longitudinally through the casing 14 in substantially parallel relation with the blade 19. The lower end of the rod, as viewed in Figs. 1 and 2, has a mechanical connection with an arm 41 projecting laterally from the support 20 and rigidly secured thereto by rivets 23a. The arm 41, as shown, is provided with an aperture 42 receiving the lower end of the rod 40. This lower end of the rod 40 is provided with an abutment 43 spaced somewhat from the body proper of the rod so as to leave a reduced section 44 which is received in the aperture 42 of the arm 41. A plate 45 with a keyhole slit surrounds the reduced portion 44 below the arm 41 to prevent withdrawal of the rod 40 from the arm. A helical compression spring 46 is mounted on the rod 40 and has one end, as shown, bearing against the arm 41 and its other end bearing against an abutment 47 which, as will be pointed out in detail hereinafter, also constitutes a wall dividing the casing 14 into two chambers 14a and 14b. The compression spring 46 takes up lost motion and insures that the plate 45 will at all times be positioned against the abutment 43.

The rod 40, as shown, extends upwardly through the top plate 38, and has a screw connection 48 with this plate. On the upper end of the rod, there is an adjusting knob 49. This knob, as shown, has a central internal cavity 50 into which the upper end of the rod 40 extends. This end of the rod is provided with a screw thread 51, which receives a nut 52 secured within the recess of the knob. Bearing on the under side of this nut is a compression spring 53 whose lower end bears upon a fixed member 54 rigidly secured to the knob. The member 54 is provided with a centrally arranged aperture to receive the upper end of the rod, as shown. It will be understood that the knob is attached to the rod by inserting the upper end of the rod through the aperture in the fixed member 54 and threading it into the nut 52.

The knob 49 is secured against rotation relative to the rod 40 by means of a lug 55 attached to the rod 40 and received in a recess 56 provided for it in the knob. The lug 55 is secured to a ring-shaped plate 57 which is mounted on a friction plate 58. The friction plate 58, as shown, has a central circular shaped guide or bearing 59 which has a diameter substantially equal to the internal diameter of the ring 57, and about which the ring is fitted. The ring 57 is secured against relative rotary and vertical motion with reference to the friction plate 58 by a pair of screws 60, but may be rotated on the plate to effect an adjustment of the knob 49 relative to the rod 40 when the screws are loosened. It will be understood that this adjustment is a factory adjustment and when once set generally does not need to be reset. The knob, as shown, is provided with a temperature scale 61 which cooperates with a fixed index 62 to assist the attendant in setting the device.

A stop 63 formed as a projection on the upper edge of the side walls of the casing limits the movement of the lug 55 in opposite directions, and thus limits the range of adjustment of the knob 49.

Preferably the outer wall 12 of the oven will be provided with an outwardly directed circular protuberance 64 under the edge of the knob 49.

It will be observed that when the knob 49 is rotated, the rod 40 will be moved longitudinally in the casing because of the threaded connection 48. This movement of the rod varies the position of the support 20 on its shaft 21, and, therefore, varies the position of the neutral line of the thermostat. This, as previously pointed out, changes the temperature setting of the control device.

As pointed out previously, the abutment 47 also constitutes a wall dividing the casing 14 into two chambers 14a and 14b. As shown, the wall 47 is located substantially in the same plane as the upper wall 10 of the heating chamber 11 through which the thermostat is inserted, and is provided with a slit 65 through which the bimetal blade passes. The lower chamber 14b constitutes a heating chamber for the bimetal bar 19. As shown, this portion of the chamber is provided with a plurality of relatively large apertures 65a and is open at the bottom so that the oven gases can freely circulate around and about the portion of the bimetal blade within the chamber 14b. Preferably, the lower ends 66 of the four side walls of the casing are tapered and bent inwardly somewhat, as clearly shown in Figs. 1 and 2, so as to form protection means for the lower end of the temperature control device.

The upper chamber 14a, as shown, houses the switch contacts 25 and 26 and the snap spring 33. The wall 47 constitutes a heat barrier between the chamber 14b and the chamber 14a whereby the switch contacts and spring are protected from the oven gases. This prevents oven greases and moisture from accumulating on the contacts, and the snap spring and its pivot seats 34 and 35, the fixed pivot 36 and knife-edge bearing on the end of the blade. This insures accuracy and sensitivity of operation. The chamber 14a is for all practical purposes a pocket closed to the circulation of the oven gases.

It will be observed in view of the foregoing arrangement that the heat is imparted by the oven gases directly to the support 20 and that portion of the thermostat bar 19 lying within the chamber 14b. Heat imparted to this portion of the bar travels by conduction to that part of the bar within the chamber 14a. Because of this arrangement, the thermostat bar 19 is arranged as is the temperature control device described and claimed in the copending application of the R. A. Winborne, Serial No. 80,770, filed May 20, 1936, and assigned to the same assignee as this invention. That is, the movable end portion 19a of the thermostat is arranged reversely to the main portion 19b in order to provide a uniform temperature control for all heat cycles of the thermostat.

In the operation of the thermostat it will be understood that terminals 32 will be connected in the oven circuit or in a controlling circuit for the oven circuit, and that the thermal blade 19 in responding to the temperature of the oven gases will operate the switch between its open and closed positions to control the energization of the oven heating element to maintain a substantially uniform temperature in the oven. The temperature that is held in the oven is adjusted by the knob 49.

While I have shown a particular embodiment of my invention, it will be understood, of course, that I do not wish to be limited thereto since many modifications may be made and I, therefore, contemplate by the appended claims to cover any such modifications as fall within the true spirit and scope of my invention.

What I claim as new and desire to secure by Letters Patent of the United States is:

1. A temperature control device comprising an elongated casing having side walls and an end wall, a relatively elongated temperature responsive element mounted lengthwise in said casing, the element having a relatively fixed portion and a portion movable in response to changes in temperature, a pivot in the end of said casing that is opposite said end wall, a support on said pivot, means securing said relatively fixed portion of said temperature responsive element to said support, a snap spring bearing on said movable portion, a fixed pivot in said end wall forming a bearing for the other end of said spring, an adjustment rod directed through said end wall having a mechanical connection with said support to vary its position on said pivot and thereby the angular relation of said movable portion of said temperature responsive element and said spring, and means outside of said casing for adjusting the position of said rod.

2. A temperature control device comprising an elongated casing having side walls and an end wall, a relatively elongated temperature responsive element mounted lengthwise in said casing, the element having a relatively fixed portion and a portion movable in response to changes in temperature, a pivot in the end of said casing that is opposite said end wall, a support on said pivot, means securing said relatively fixed portion of said temperature responsive element to said support, a snap spring bearing on said movable portion, a fixed pivot in said end wall forming a bearing for the other end of said spring, an adjustment rod directed through said end wall and extending into said casing substantially to the location of said first pivot, a member on said support extending laterally therefrom having an aperture receiving the inner end of said rod, said rod having a reduced section defining a head on said inner end, a plate received in said reduced section bearing against said member to prevent withdrawal of the member from the rod, a spring acting on said member forcing it into engagement with said head, and means outside of said casing for adjusting the position of said rod.

3. A temperature control device comprising a movable support, a bimetallic thermostat bar having one end rigidly secured to said support, and its other end free to move in response to temperature changes, a fixed support opposite said latter end, an extension on said movable support substantially at right angles to said bimetallic bar, an adjusting screw mounted in said fixed support in substantially parallel relation with said bimetallic bar having one end directed through an aperture provided for it in said end of said extension, an abutment on said screw bearing on the adjacent side of said extension and a spring on the other side of said extension forcing said extension into engagement with said abutment.

4. In an oven having inner inner and outer walls defining a heating chamber and an outer casing spaced from the heating chamber, a casing adapted to be inserted through said walls so that the inner end of the casing projects into said heating chamber, a switch in the portion of said casing that is within the space between said heating chamber and outer casing, a thermostatic bar secured in the portion of said casing that extends into said heating chamber connected to said switch to operate it between its opened and closed positions responsively to the temperature of the heating chamber, a snap-acting spring within the casing portion housing said spring cooperating with said thermostatic member to operate it between its open and closed positions with a snap action, a partition in said casing interposed between said heating chamber and said switch and spring substantially closing the portion of said casing housing these members to the heating chamber.

5. A temperature control device for ovens and the like comprising a casing having an inner end portion arranged to be inserted through a wall of said oven into the heating chamber thereof and an outer portion outside of the heating chamber, a thermostatic bar in said casing having one end fixed in said inner end portion and its other end free to move in the outer end portion of said casing, a switch in said outer end portion operated by said free end, a transverse partition in said casing between said inner and outer end portions positioned substantially in alignment with said wall of said oven, and said inner end portion of said casing being provided with relatively large openings to permit the oven gases to circulate freely around and about the part of said thermostat in said portion.

6. In an oven provided with an inner lining defining a heating chamber and an outer lining spaced therefrom, together with insulating material in the space between said linings, a temperature control device comprising an elongated casing projecting through said linings and insulating material so as to have an inner end portion projecting into said heating chamber, a bimetallic thermostat bar within and extending longitudinally of said casing having its inner end secured in the inner end portion of said casing and its other end free to move laterally in the outer portion of said casing between said linings, a snap spring in said latter portion acting on said free end, a switch also in said latter portion operated by said free end, said inner portion of said casing having openings to permit the oven gases to circulate about the portion of said bar in said inner portion, a partition in said casing between said inner and outer portions thereof to protect said switch and spring from said oven gases and provided with a slot through which said bar passes, and a temperature adjusting knob for said control device accessible on the exterior of said outer lining.

7. In an oven having inner walls defining a heating chamber and outer walls defining an outer casing spaced from the heating chamber, a temperature control device comprising a casing adapted to be inserted through said inner and outer walls so that the inner end of the casing projects into said heating chamber, a switch in the portion of said casing that is within the space between said heating chamber and outer casing, a thermostatic member secured in the portion of said casing that extends into said heating chamber connected to said switch to operate it between its opened and closed positions responsively to the temperature of the heating chamber, and a partition in said casing interposed between said heating chamber and said switch substantially closing the portion of said casing housing the switch to the heating chamber.

8. In an oven having inner walls defining a heating chamber and outer walls defining an outer casing spaced from the heating chamber, a temperature control device comprising a casing adapted to be inserted through said outer and inner walls so that the inner end of the casing projects into said heating chamber, a switch in the portion of said casing that is within the space between said heating chamber and outer casing, a thermostatic member secured in the portion of said casing that extends into said heating chamber connected to said switch to operate it between its opened and closed positions responsively to the temperature of the heating chamber, a partition in said casing interposed between said heating chamber and said switch substantially closing the portion of said casing housing the switch to the heating chamber, and said portion of said casing within said heating chamber having openings to provide for the circulation of oven gases through the portion.

9. In an oven having inner walls defining a heating chamber and outer walls defining an outer casing spaced from the heating chamber, a temperature control device comprising a casing adapted to be inserted through said outer and inner walls so that the inner end of the casing projects into said heating chamber, a switch in the portion of said casing that is within the space between said heating chamber and outer casing, a thermostatic member secured in the portion of said casing that extends into said heating chamber connected to said switch to operate it between its opened and closed positions responsively to the temperature of the heating chamber, a partition in said casing interposed between said heating chamber and said switch substantially closing the portion of said casing housing the switch to the heating chamber, a temperature adjustment rod extending through the casing and partition to extend into the portion of the casing in said heating chamber and operably associated with the thermostatic member secured in said portion to change the temperature setting of said control device when the position of said rod is changed, and means associated with said rod outside of said outer casing for adjusting the position of said rod.

10. In an oven having inner walls defining a heating chamber and outer walls defining an outer casing spaced from the heating chamber, a temperature control device comprising a casing adapted to be inserted through said outer and inner walls so that the inner end of the casing projects into said heating chamber, an opening in the portion of said casing that is within the space between said heating chamber and outer casing, an insulating support outside of said casing closing said opening and carrying switch contacts that are presented to the interior of said casing, movable switching means within said casing opposite said opening for opening and closing said contacts, a thermostatic member secured in the portion of said casing that extends into said heating chamber connected to said movable switching means to operate said means to open and close said contacts responsively to the temperature of the heating chamber, and a partition in said casing interposed between said heating chamber and said switching means and contacts substantially closing the portion of said casing that houses them to the heating chamber.

WALLACE J. ETTINGER.